United States Patent [19]
Roush
[11] Patent Number: 5,042,151
[45] Date of Patent: Aug. 27, 1991

[54] METHOD FOR REMOVING AND INSERTING VALVE SEATS

[75] Inventor: Walter T. Roush, Houston, Tex.
[73] Assignee: Keystone International, Inc., Houston, Tex.

[21] Appl. No.: 573,396
[22] Filed: Aug. 27, 1990

Related U.S. Application Data

[62] Division of Ser. No. 443,321, Nov. 30, 1989, Pat. No. 4,982,483.

[51] Int. Cl.5 ........ B23P 7/00
[52] U.S. Cl. ........ 29/890.124; 29/890.121; 29/426.5; 29/213.1
[58] Field of Search ........ 29/890.124, 890.121, 29/525, 426.5, 213.1, 267, 280, 282; 254/21, 25, 131; 81/58.2, DIG. 8; 251/309, 311, 360

[56] References Cited

U.S. PATENT DOCUMENTS 1,422,121 7/1922 Millen .
1,553,171 9/1925 Jones .
2,207,888 7/1940 Jones .
2,276,303 3/1942 Herrig .
2,339,210 1/1944 Volz .
2,471,557 5/1949 Bishop .
3,063,148 11/1962 Brilmyer .
3,335,486 8/1967 Jones .
3,447,228 6/1969 Knickerbocker .
3,495,623 2/1970 Sespersen ........ 29/890.124
3,656,714 4/1972 Peterson ........ 29/890.124
3,755,876 9/1973 Beasley ........ 29/890.121
3,978,573 9/1976 Williams .
4,218,042 8/1980 Edel ........ 29/890.124
4,452,427 6/1984 Webb ........ 29/890.124
4,494,290 1/1985 Rutledge .
4,649,618 3/1987 Harrison .
4,719,684 1/1988 Mutter .

*Primary Examiner*—Irene Cuda
*Attorney, Agent, or Firm*—Dodge Bush Moseley & Riddle

[57] ABSTRACT

A method for removing and inserting a tubular frustoconical seat (26) from the seat cavity (22) of a valve chamber (20) in a valve body (12). The tool (46) for performing the method has a laterally extending protuberance (60) on its inner end adapted to be received within a port (38) of the seat (26) for prying the seat (26) loose upon a prying action of the tool (46). An annular shoulder (56) on the tool (10) engages the outer annular surface (42) of the seat (26) for providing a pivot axis.

3 Claims, 2 Drawing Sheets

METHOD FOR REMOVING AND INSERTING VALVE SEATS

This application is a divisional of application Ser. No. 443,321, filed Nov. 30, 1989, now U.S. Pat. No. 4,982,483.

BACKGROUND OF THE INVENTION

This invention relates to a valve seat tool and method for removing and inserting valve seats, and more particularly to such a tool which is adapted to engage the valve seat for removal and insertion thereof, upon removal of the associated valve member from the valve body.

Heretofore, particularly for hand operated valves having a straight through flow passage, a valve seat having a pair of axially aligned ports therein for alignment with the flow passage has been provided and receives a valve member for blocking fluid flow through the flow passage.

The valve member may be a tapered plug member, for example, which is movable upon rotation of a valve stem between an extended position blocking fluid flow through the flow passage and a retracted position permitting fluid flow through the flow passage. The valve seat or seat insert is preferably of a frusto-conical shape formed of a soft non-metallic material such as a resilient plastic material, for example, or formed of a metallic material, such as stainless steel, for example.

The seat is normally mounted within a cavity in a valve body with a press friction fit and to remove the seat for repair or replacement, a punch or screw driver has been inserted within the flow passage from an end port or bonnet opening for prying the seat from its cavity. When the seat "snaps" free, the punch or rod may strike and damage the valve body portion about the flow passage at the seat.

Also, since the punch or screw driver is inserted within the flow passage which may be relatively long and of a relatively small diameter, it may be difficult under certain conditions to obtain sufficient leverage for prying the valve seat loose.

SUMMARY OF PRESENT INVENTION

The present invention is directed to a valve seat tool for removal and insertion of a valve seat from the valve chamber of the valve body after removal of the valve member from the chamber. One valve with which the tool comprising the present invention is particularly adapted for use is a hand operated valve having a straight through flow passage with the valve seat being inserted within the valve chamber with ports therein in axial alignment with the flow passage. The valve seat receives the valve member in its closed position for blocking fluid flow through the flow passage.

The seat removal tool is inserted within the valve body chamber after removal of the valve member and associated bonnet from the valve body and has a protuberance on its inner end which is adapted to be inserted within a port of the valve seat. After insertion of the protuberance within the valve seat port, the tool is rocked or pivoted in a plane parallel to the longitudinal axis of the flow passage to snap the valve seat from its seat cavity within the valve chamber of the body. Upon unseating of the valve seat, the valve seat is lifted by the tool from the valve chamber. A visual indicator on the outer end of the tool extends in the direction of the protuberance for alignment of the protuberance with a valve seat port.

For insertion of the initial or replacement seat within the seat cavity of the valve chamber, a port in the seat is first engaged by the protuberance on the end of the tool for initial positioning of the seat within the seat cavity over an alignment pin within the cavity, and then a shoulder on the tool adjacent the protuberance engages the upper annular end surface of the seat for pressing the seat in place upon a downward force exerted by the tool.

It is an object of this invention to provide a method and tool for removing and inserting valve seats in a valve chamber upon removal of the associated valve member from the valve body.

It is a further objection of this invention to provide such a method and tool particularly adapted for the removal and insertion of a seat having a pair of ports therein for axial alignment with a straight through flow passage in the valve body.

Other objects, features and advantages of the invention will become more apparent after referring to the following specification and drawings.

DESCRIPTION OF THE INVENTION

Figure 1:
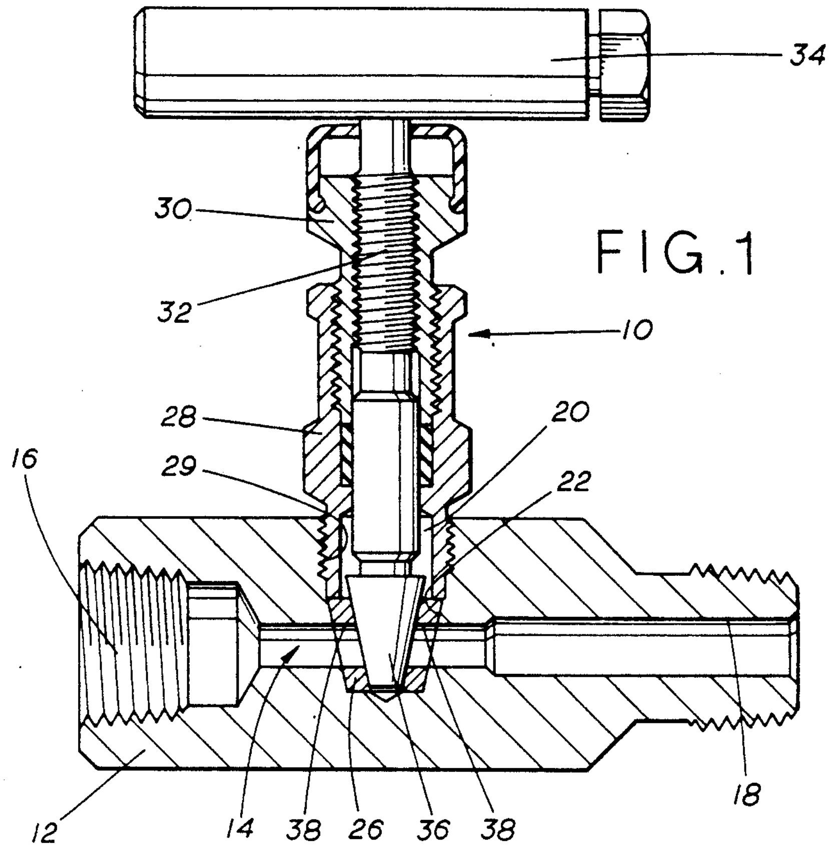
FIG. 1 is a sectional view of a hand operated valve with which the valve seat tool of the present invention is particularly adapted with use and having a seat with a pair of ports therein in axial alignment with a straight through flow passage in the valve body.
Figure 2:
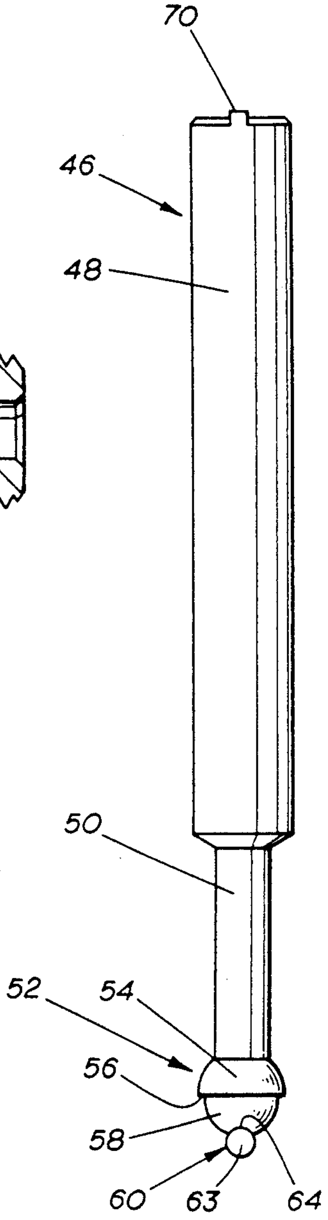
FIG. 2 is a front elevation of the tool of the present invention adapted for use with the valve shown in FIG. 1.

Referring now to the drawings for a better understanding of this invention, and more particularly to FIG. 1, a so-called hand valve is indicated generally at 10 as an example of a type of valve with which the present invention may be utilized. Valve 10 includes a valve body 12 having a straight through flow passage 14 therein including an outlet portion 16 and inlet portion 18. A valve chamber is generally indicated at 20 (see also FIGS. 5-7) and includes a seat pocket or seat cavity 22 therein. An alignment pin 24 extends from the bottom of seat cavity 22 for alignment of a valve seat generally indicated at 26 as will be explained further below.

An externally threaded valve bonnet is shown at 28 and is threaded with internal screw threads 29 of valve chamber 20. An externally threaded bushing 30 is threaded within the outer end of bonnet 28. An externally threaded valve stem 32 is threaded within bushing 30 and has a handle 34 on the outer end. A tapered valve member 36 is mounted on the inner end of stem 32 and is adapted to be received within valve seat 26 for blocking fluid flow through flow passage 14 in a closed position, as shown in FIG. 1. Upon rotation of handle 34, tapered valve member 36 is moved to the seated position as shown in FIG. 1 and upon rotation of handle 34 in an opposite direction, tapered valve member 36 is moved to a retracted open position removed from seat 2 to permit fluid flow through flow passage 14.

Figure 6:
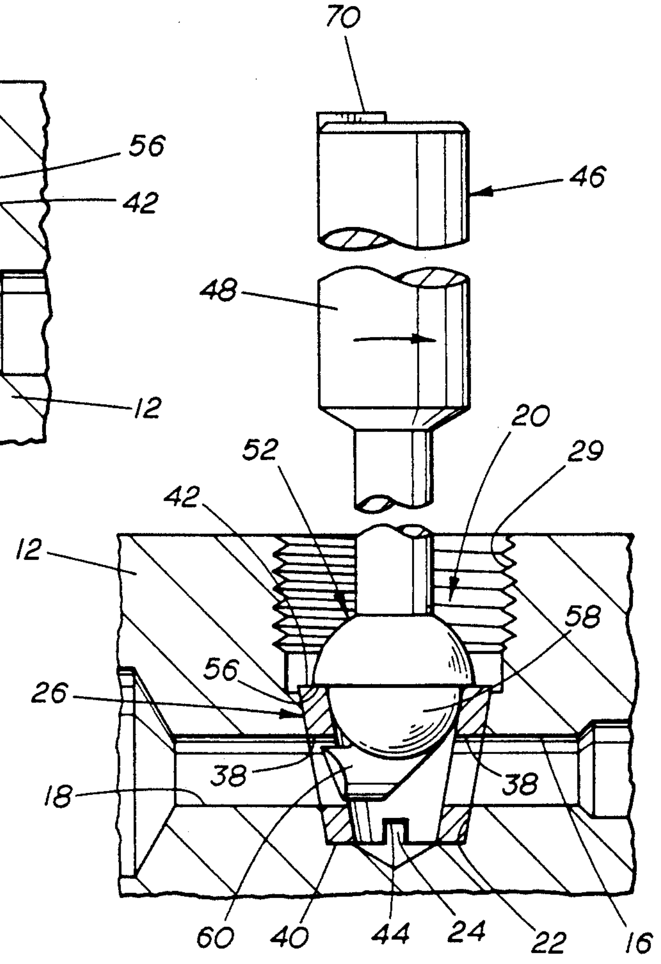
FIG. 6 is a fragmentary sectional view of the valve body similar to FIG. 5 but showing a shoulder of the tool engaging the upper annular surface of the seat for pressing the seat into inserted position within the valve chamber.

Seat 26 is of a generally frusto-conical tubular shape and has a pair of opposed ports 38 therein in axial alignment with flow passage 14 when valve seat 26 is in installed position as shown particularly in FIGS. 1 and 6. Seat 26 has a lower annular surface shown at 40 and an upper outer annular surface shown at 42. For alignment of ports 38 with flow passage 14, a notch or slot 44 is provided in lower annular surface 40 to receive alignment pin 24 for the accurate positioning of valve seat 26 within valve cavity 22.

Referring now to FIGS. 2-5, the valve seat tool of the present invention is indicated generally at 46. Tool 46 includes an elongate body having an outer handle 48 adapted to be gripped manually, and a small diameter body portion 50 at the inner end of handle 48. A seat actuator shown generally at 52 is secured to the inner or lower end of small diameter body portion 50. Seat actuator 52 includes an annular skirt 54 defining an annular shoulder or flange 56 at its inner end. A generally bulbous hemispherical end portion shown at 58 is integral with skirt 54 and a generally lateral extending protuberance or extension is shown at 60 projecting from hemispherical end portion 58 in a generally lateral direction substantially at right angles to the longitudinal axis of tool 46.

Figure 3:
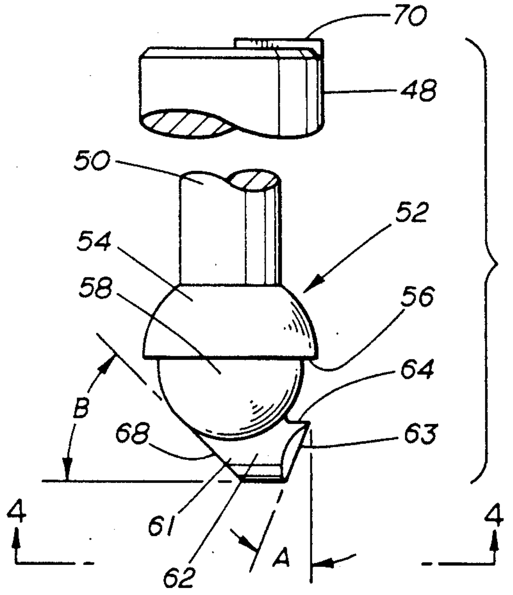
FIG. 3 is a partial side elevation of the valve seat tool shown in FIG. 2 and illustrating the protuberance on the inner end of the tool for fitting within a port of the seat to be removed.
Figure 4:
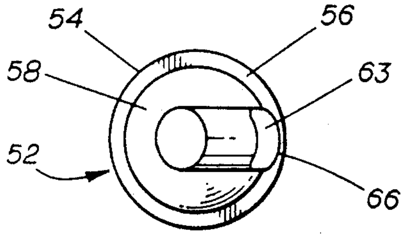
FIG. 4 is an end elevational view of the valve seat tool shown in FIG. 3 taken generally along the line 4—4 of FIG. 3.

Protuberance 60 extends from bulbous hemispherical portion 58 in a continuation of the outer surface of portion 58 and curves laterally therefrom to form an arcuate elbow portion 61 and a shank 62 having an end face 63. Shank 62 is of a generally circular cross-section and end face 63 tapers inwardly from its outer or upper arcuate surface 64 at an angle A of around twenty-five (25) degrees as shown in FIG. 3 with respect to the longitudinal axis of tool 46. Additionally, face 63 is formed of a radius as shown particularly in FIG. 4 at 66. A rear surface 68 of elbow portion 61 opposite face 63 extends at an angle B of around forty-five (45) degrees with respect to the longitudinal axis of tool 46 and forms a generally smooth continuation of the adjacent surface of hemispherical portion 58.

Hemispherical or bulbous portion 58 is of a size sufficient to fit within the outer end of valve seat 26 as shown particularly in FIG. 6 with annular shoulder 56 engaging the upper annular surface 42 of valve seat 26 and protuberance 60 fitting within a seat port 38. For alignment of protuberance 60 with a seat port 38, a visually observable indicator 70 is provided on the outer end of handle 48 and extends in the same direction as shank 62 thereby to permit protuberance 60 to be accurately aligned with a desired port 38 with upper annular surface 64 of shank 62 adapted to engage the annular seat surface defining port 38. While indicator 70 is shown as a projection, a notch may be utilized as an indicator, if desired.

Figure 5:
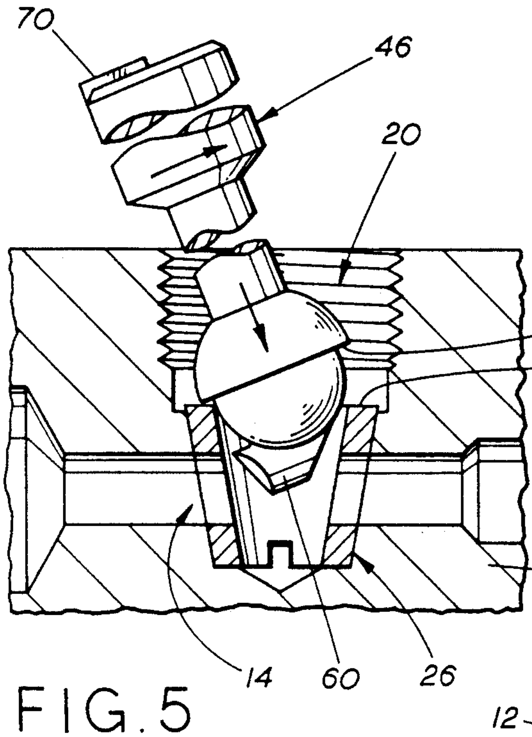
FIG. 5 is a fragmentary sectional view of a valve body showing a seat in the valve body chamber and the valve seat tool of this invention extending within the valve chamber immediately prior to engagement with the seat.
Figure 7:
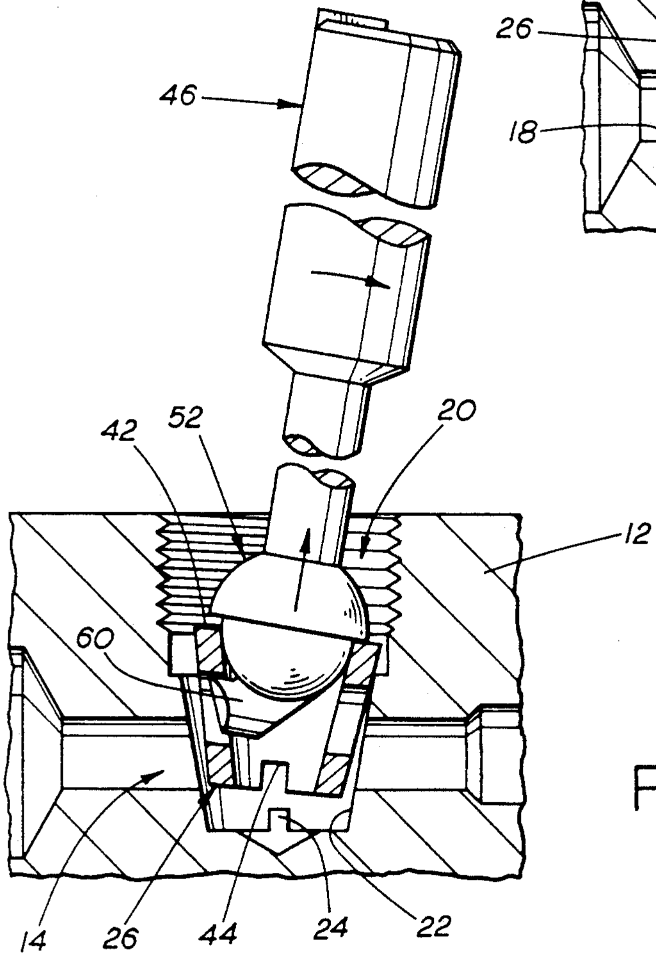
FIG. 7 is a fragmentary sectional view of the valve body similar to FIGS. 5 and 6 but showing the tool in engagement with the seat and removing the seat from the valve chamber.

In operation, and referring to FIGS. 5-7, the method utilized by valve seat tool 46 for the insertion and removal of seat 26 is illustrated. For removal of seat 26, bonnet 28 along with tapered valve member 36 and bushing 30 are removed from valve body 12 by unthreading of bonnet 28. Valve chamber 20 is then open exposing valve seat 26 for removal by tool 46. First, as shown in FIG. 5, tool 46 is inserted within chamber 20 with protuberance 60 aligned with a selected valve port 38 and indicator 70 indicating the accurate alignment of protuberance 60. Shoulder 56 is seated on upper annular surface 42 of valve seat 26 as shown in FIG. 6 with hemispherical portion 58 being received within valve seat 26. Handle 48 is then pivoted in a direction parallel to the longitudinal axis of flow passage 14 with shoulder 56 acting as a pivot axis as shown in FIG. 7 for the pivoting of protuberance 60 so that upper annular surface 64 of shank 62 thereof engages the adjacent surface defining port 38 for prying seat 26 loose from seat cavity 22. Seat 26 is then lifted from valve body 12 by outer or upward movement of handle 48.

For installation of a valve seat 26, the procedure is reversed with seat 26 being positioned on tool 46 and protuberance 60 engaged with a seat port 38. Indicator 70 is utilized for positioning notch or slot 44 in alignment with pin 24. After slot 44 is in alignment with pin 24, a downward force on handle 48 forces annular shoulder 56 against upper annular surface 42 about seat 26 to force seat 26 into the seat cavity 22 of valve chamber 20. Then, tool 46 is pivoted in an arcuate direction opposite the direction for the removal of seat 26 to remove protuberance 60 from port 38 as shown in FIG. 5. In this position, tool 46 may be lifted from valve chamber 20 and bonnet 28, along with valve stem 32 and valve member 36, may then be threaded within valve body 12.

As previously indicated, valve seat 26 may be a so-called soft seat formed of a plastic or elastomeric material, for example, to provide a bubble type seal. However, it may be desirable under certain conditions to form seat 26 of a metal construction, such as for use with particular ladings, for example.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. A method of removing a tubular valve seat from the valve chamber of a valve body with the seat having a pair of opposed ports in axial alignment with a straight flow passage extending through the valve body; the method comprising the steps of:

providing an elongate seat removal tool having a laterally extending protuberance on its inner end;

providing the elongate seat removal tool with a shoulder adjacent the laterally extending protuberance adapted to engage the upper annular surface of the valve seat upon the applying of leverage against the tool thereby to form a pivotal axis for the prying action;

removing a valve member from the valve chamber of the body for exposing the valve chamber and valve seat fitting within the valve chamber;

inserting the elongate seat removal tool having a generally laterally extending protuberance on its inner end within the exposed valve chamber with the protuberance fitting within a port the valve seat;

next applying leverage against the tool in a direction along a plane extending generally through the longitudinal axis of the flow passage to permit the protuberance to engage the outermost arcuate surface of the seat defining the port for unseating of the seat in a prying action; and then removing the seat from the valve chamber.

2. A method of installing a tubular valve seat within the open valve chamber of a valve body with the seat adapted to receive a valve member therein and having a pair of opposed ports adapted to be positioned in axial alignment with a straight flow passage extending through the valve body upon installation; the method comprising the steps of:

providing an elongate seat insertion tool having a laterally extending protuberance on its inner end and an annular shoulder adjacent the laterally extending protuberance;

positioning the valve seat within the valve chamber in a position to be seated within a seat cavity with the ports thereon adapted for axial alignment with the flow passage;

providing alignment means between the valve body and seat for alignment of said ports in said seat with the flow passage;

positioning said tool over said seat with the protuberance thereof fitting within a port of said seat and the annular shoulder of said tool in abutting engagement with the upper annular surface of said seat; and exerting a downward force on said tool for pressing said seat within its seat cavity in seated position with said alignment means aligning said ports with the flow passage.

3. The method of installing a tubular valve seat as set forth in claim 2 wherein the valve seat is frusto-conically shaped and the valve member is a tapered plug valve member; said method further including the step of:

providing the elongate seat insertion tool with a generally hemispherical bulbous position between the annular shoulder and the protuberance of a diameter to be received within the frusto-conically shaped valve seat with the adjacent annular shoulder in abutting engagement with the outer annular surface of said seat for exerting a downward force against the valve seat for seating of said valve seat within its seat cavity.

* * * * *